United States Patent
Cavallo

(10) Patent No.: US 7,757,238 B2
(45) Date of Patent: Jul. 13, 2010

(54) TASK SWITCHING WITH A TASK CONTAINING CODE REGION TO ADJUST PRIORITY

(75) Inventor: Joseph S. Cavallo, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 1714 days.

(21) Appl. No.: 10/881,654

(22) Filed: Jun. 29, 2004

(65) Prior Publication Data

US 2005/0289552 A1 Dec. 29, 2005

(51) Int. Cl.
*G06F 9/46* (2006.01)
*G06F 5/00* (2006.01)

(52) U.S. Cl. .................. 718/108; 718/103; 710/52

(58) Field of Classification Search .............. 718/103, 718/108; 710/52

See application file for complete search history.

(56) References Cited

U.S. PATENT DOCUMENTS

| 6,904,483 B2* | 6/2005 | Koning et al. ............ 710/244 |
| 6,957,433 B2* | 10/2005 | Umberger et al. .......... 718/103 |
| 7,089,557 B2* | 8/2006 | Lee ....................... 718/102 |
| 2005/0262269 A1* | 11/2005 | Pike ....................... 710/1 |

OTHER PUBLICATIONS

Oh et al. "A Modified Least -Laxity-First Scheduling Algorithm for Real-Time Tasks", Real-Time Computing Systems and Applications, IEEE, 1998, Proceedings. Fifth International Conference on Oct. 27-29, 1998 pp. 31-36.*

Kalinsky, David. "RTOSes, 'mutexes' fight priority inversion", Electronic Times, Apr. 9, 2001.*

* cited by examiner

*Primary Examiner*—Meng-Ai An
*Assistant Examiner*—Kenneth Tang
(74) *Attorney, Agent, or Firm*—Caven & Aghevli LLC

(57) ABSTRACT

Briefly, techniques to reduce the impact of interrupts and swaps on the completion time of tasks. In an embodiment, a code segment within a task adjusts the priority of the task. Other embodiments are also disclosed.

35 Claims, 5 Drawing Sheets

TASK SWITCHING WITH A TASK CONTAINING CODE REGION TO ADJUST PRIORITY

DESCRIPTION OF RELATED ART

Applications that utilize task scheduling (e.g., multitasking operating systems, real time operating systems, and kernels) have the challenge of managing task switching. One task scheduling strategy is known as the preemptive multitasking strategy with time slicing. In this model, out of all the tasks in a ready state, the task with the highest priority (e.g., the task with the highest or lowest associated priority number) will run until it is no longer in the ready state or another task with a higher priority enters the ready state. For example, the task may no longer be in a ready state when the task waits for a semaphore or resource or the task completes. According to preemptive multitasking strategy with time slicing, when there are two tasks in the ready state and each has the highest priority, one of the two tasks will run for a certain amount of time, then get interrupted or swapped-out for the other task, which runs for the same amount of time.

Any task scheduling model that uses preemption or time slicing must manage the tradeoff of getting the higher priority task to quickly execute and also minimize task switching because of the considerable task switching overhead expense (e.g., idle processor time).

BRIEF DESCRIPTION OF THE DRAWINGS

Note that use of the same reference numbers in different figures indicates the same or like elements.

DETAILED DESCRIPTION

Figure 1:
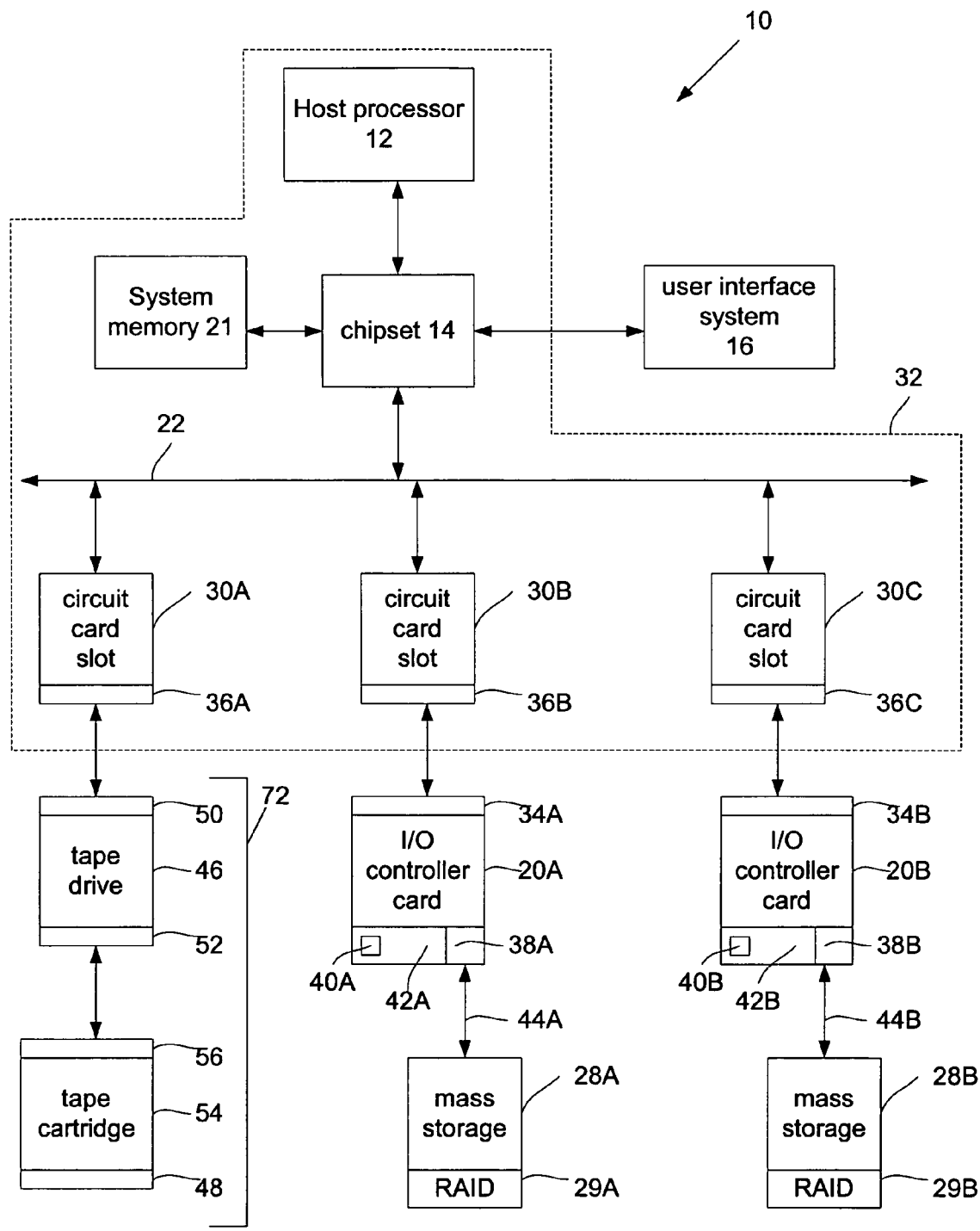
FIG. 1 illustrates a system in accordance with an embodiment of the present invention.

FIG. 1 illustrates a system embodiment 10. System 10 may include a host processor 12 coupled to a chipset 14. Host processor 12 may comprise, for example, an Intel® Pentium® III or IV microprocessor commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system (not shown) that may couple host processor 12, a system memory 21 and a user interface system 16 to each other and to a bus system 22. Chipset 14 may also include an input/output (I/O) bridge/hub system (not shown) that may couple the host bridge/bus system to bus 22. Chipset 14 may comprise integrated circuit chips, such as those selected from integrated circuit chipsets commercially available from the Assignee of the subject application (e.g., graphics memory and I/O controller hub chipsets), although other integrated circuit chips may also, or alternatively be used, without departing from this embodiment. Additionally, chipset 14 may include an interrupt controller (not shown) that may be coupled, via one or more interrupt signal lines (not shown), to other components, such as, e.g., I/O controller circuit card 20A, I/O controller card 20B, and/or one or more tape drives (collectively and/or singly referred to herein as "tape drive 46"), when card 20A, card 20B, and/or tape drive 46 are inserted into circuit card bus extension slots 30B, 30C, and 30A, respectively. This interrupt controller may process interrupts that it may receive via these interrupt signal lines from the other components in system 10. In some cases, the interrupt controller may process interrupts received from modules within the host processor 12. For example, host processor 12 may utilize a timer that can interrupt a running thread to run another interrupt service routine.

The operative circuitry 42A and 42B described herein as being comprised in cards 20A and 20B, respectively, need not be comprised in cards 20A and 20B, but instead, without departing from this embodiment, may be comprised in other structures, systems, and/or devices that may be, for example, comprised in motherboard 32, coupled to bus 22, and exchange data and/or commands with other components in system 10. User interface system 16 may comprise, e.g., a keyboard, pointing device, and display system that may permit a human user to input commands to, and monitor the operation of, system 10.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (as well as revisions thereof) (hereinafter referred to as a "PCI bus"). Alternatively, bus 22 instead may comprise a bus that complies with the PCI Express specification or the PCI-X specification. Also alternatively, bus 22 may comprise other types and configurations of bus systems, without departing from this embodiment.

I/O controller card 20A may be coupled to and control the operation of a set of one or more magnetic disk, optical disk, solid-state, and/or semiconductor mass storage devices (hereinafter collectively or singly referred to as "mass storage 28A"). In this embodiment, mass storage 28A may comprise, e.g., a mass storage subsystem comprising one or more redundant arrays of inexpensive disk (RAID) mass storage devices 29A.

I/O controller card 20B may be coupled to and control the operation of a set of one or more magnetic disk, optical disk, solid-state, and/or semiconductor mass storage devices (hereinafter collectively or singly referred to as "mass storage 28B"). In this embodiment, mass storage 28B may comprise, e.g., a mass storage subsystem comprising one or more redundant arrays of inexpensive disk (RAID) mass storage devices 29B.

Processor 12, system memory 21, chipset 14, bus 22, and circuit card slots 30A, 30B, and 30C may be comprised in a single circuit board, such as, for example, a system motherboard 32. Mass storage 28A and/or mass storage 28B may be comprised in one or more respective enclosures that may be separate from the enclosure in which motherboard 32 and the components comprised in motherboard 32 are enclosed.

Depending upon the particular configuration and operational characteristics of mass storage 28A and mass storage 28B, I/O controller cards 20A and 20B may be coupled to mass storage 28A and mass storage 28B, respectively, via one or more respective network communication links or media 44A and 44B. Cards 20A and 20B may exchange data and/or commands with mass storage 28A and mass storage 28B, respectively, via links 44A and 44B, respectively, using any one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, I/O controller cards 20A and 20B may exchange data and/or commands with mass storage 28A and mass storage 28B, respectively, using other communication protocols, without departing from this embodiment.

In accordance with this embodiment, a SCSI protocol that may be used by controller cards 20A and 20B to exchange data and/or commands with mass storage 28A and 28B, respectively, may comply or be compatible with the interface/ protocol described in American National Standards Institute (ANSI) Small Computer Systems Interface-2 (SCSI-2) ANSI X3.131-1994 Specification. If a FC protocol is used by controller cards 20A and 20B to exchange data and/or commands with mass storage 28A and 28B, respectively, it may comply or be compatible with the interface/protocol described in ANSI Standard Fibre Channel (FC) Physical and Signaling Interface-3 X3.303:1998 Specification. Alternatively, if an Ethernet protocol is used by controller cards 20A and 20B to exchange data and/or commands with mass storage 28A and 28B, respectively, it may comply or be compatible with the protocol described in Institute of Electrical and Electronics Engineers, Inc. (IEEE) Std. 802.3, 2000 Edition, published on Oct. 20, 2000. Further, alternatively, if a S-ATA protocol is used by controller cards 20A and 20B to exchange data and/or commands with mass storage 28A and 28B, respectively, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by controller cards 20A and 20B to exchange data and/or commands with mass storage 28A and 28B, respectively, it may comply or be compatible with the protocols described in Internet Engineering Task Force (IETF) Request For Comments (RFC) 791 and 793, published September 1981.

Circuit card slots 30A, 30B, and 30C may comprise respective PCI expansion slots that may comprise respective PCI bus connectors 36A, 36B, and 36C. Connectors 36A, 36B, and 36C may be electrically and mechanically mated with PCI bus connectors 50, 34A, and 34B that may be comprised in tape drive 46, card 20A, and card 20B, respectively. Circuit cards 20A and 20B also may include respective operative circuitry 42A and 42B. Circuitry 42A may comprise a respective processor (e.g., an Intel® Pentium® III or IV microprocessor) and respective associated computer-readable memory (collectively and/or singly referred to hereinafter as "processor 40A"). Circuitry 42B may comprise a respective processor (e.g., an Intel® Pentium® III or IV microprocessor) and respective associated computer-readable memory (collectively and/or singly referred to hereinafter as "processor 40B"). The respective associated computer-readable memory that may be comprised in processors 40A and 40B may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, such computer-readable memory may comprise other and/or later-developed types of computer-readable memory. Also either additionally or alternatively, processors 40A and 40B each may comprise another type of microprocessor, such as, for example, a microprocessor that is manufactured and/or commercially available from a source other than the Assignee of the subject application, without departing from this embodiment.

Respective sets of machine-readable firmware program instructions may be stored in the respective computer-readable memories associated with processors 40A and 40B. These respective sets of instructions may be accessed and executed by processors 40A and 40B, respectively. When executed by processors 40A and 40B, these respective sets of instructions may result in processors 40A and 40B performing the operations described herein as being performed by processors 40A and 40B.

Circuitry 42A and 42B may also comprise cache memory 38A and cache memory 38B, respectively. In this embodiment, cache memories 38A and 38B each may comprise one or more respective semiconductor memory devices. Alternatively or additionally, cache memories 38A and 38B each may comprise respective magnetic disk and/or optical disk memory. Processors 40A and 40B may be capable of exchanging data and/or commands with cache memories 38A and 38B, respectively, that may result in cache memories 38A and 38B, respectively, storing in and/or retrieving data from cache memories 38A and 38B, respectively, to facilitate, among other things, processors 40A and 40B carrying out their respective operations.

Tape drive 46 may include cabling (not shown) that couples the operative circuitry (not shown) of tape drive 46 to connector 50. Connector 50 may be electrically and mechanically coupled to connector 36A. When connectors 50 and 36A are so coupled to each other, the operative circuitry of tape drive 46 may become electrically coupled to bus 22. Alternatively, instead of comprising such cabling, tape drive 46 may comprise a circuit card that may include connector 50.

Tape drive 46 also may include a tape read/write mechanism 52 that may be constructed such that a mating portion 56 of a tape cartridge 54 may be inserted into mechanism 52. When mating portion 56 of cartridge 54 is properly inserted into mechanism 52, tape drive 46 may use mechanism 52 to read data from and/or write data to one or more tape data storage media 48 (also referenced herein in the singular as, for example, "tape medium 48") comprised in cartridge 54, in the manner described hereinafter. Tape medium 48 may comprise, e.g., an optical and/or magnetic mass storage tape medium. When tape cartridge 54 is inserted into mechanism 52, cartridge 54 and tape drive 46 may comprise a backup mass storage subsystem 72.

Slots 30B and 30C are constructed to permit cards 20A and 20B to be inserted into slots 30B and 30C, respectively. When card 20A is properly inserted into slot 30B, connectors 34A and 36B become electrically and mechanically coupled to each other. When connectors 34A and 36B are so coupled to each other, circuitry 42A in card 20A may become electrically coupled to bus 22. When card 20B is properly inserted into slot 30C, connectors 34B and 36C become electrically and mechanically coupled to each other. When connectors 34B and 36C are so coupled to each other, circuitry 42B in card 20B may become electrically coupled to bus 22. When tape drive 46, circuitry 42A in card 20A, and circuitry 42B in card 20B are electrically coupled to bus 22, host processor 12 may exchange data and/or commands with tape drive 46, circuitry 42A in card 20A, and circuitry 42B in card 20B, via chipset 14 and bus 22, that may permit host processor 12 to monitor and control operation of tape drive 46, circuitry 42A in card 20A, and circuitry 42B in card 20B. For example, host processor 12 may generate and transmit to circuitry 42A and 42B in cards 20A and 20B, respectively, via chipset 14 and bus 22, I/O requests for execution by mass storage 28A and 28B, respectively. Circuitry 42A and 42B in cards 20A and 20B, respectively, may be capable of generating and providing to mass storage 28A and 28B, via links 44A and 44B, respectively, commands that, when received by mass storage 28A and 28B may result in execution of these I/O requests by mass storage 28A and 28B, respectively. These I/O requests, when executed by mass storage 28A and 28B, may result in, for example, reading of data from and/or writing of data to mass storage 28A and/or mass storage 28B.

Figure 2:
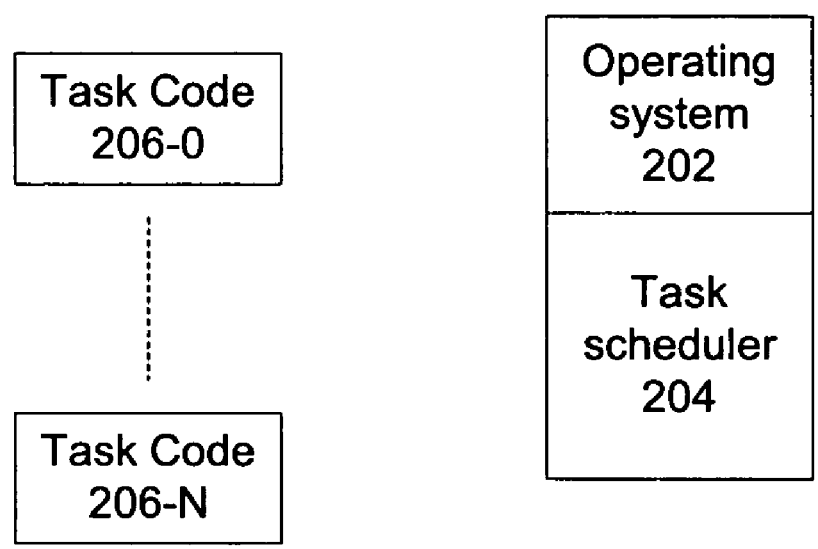
FIG. 2 depicts an example of contents of a computer-readable memory in accordance with an embodiment of the present invention.

I/O controller circuit card 20A and/or 20B may utilize some embodiments of the present invention that provide for efficient task scheduling techniques. FIG. 2 depicts an example of memory contents of I/O controller circuit card 20A and/or 20B. For example, such memory contents may include an operating system 202, a task scheduler 204, and task codes 206-0 to 206-N, although other contents may be used. In one implementation, task scheduler 204 manages an order in which task codes 206-0 to 206-N execute. For example, task scheduler 204 may order tasks based, in part, on a priority number associated with each task code 206-0 to 206-N.

Figure 3:
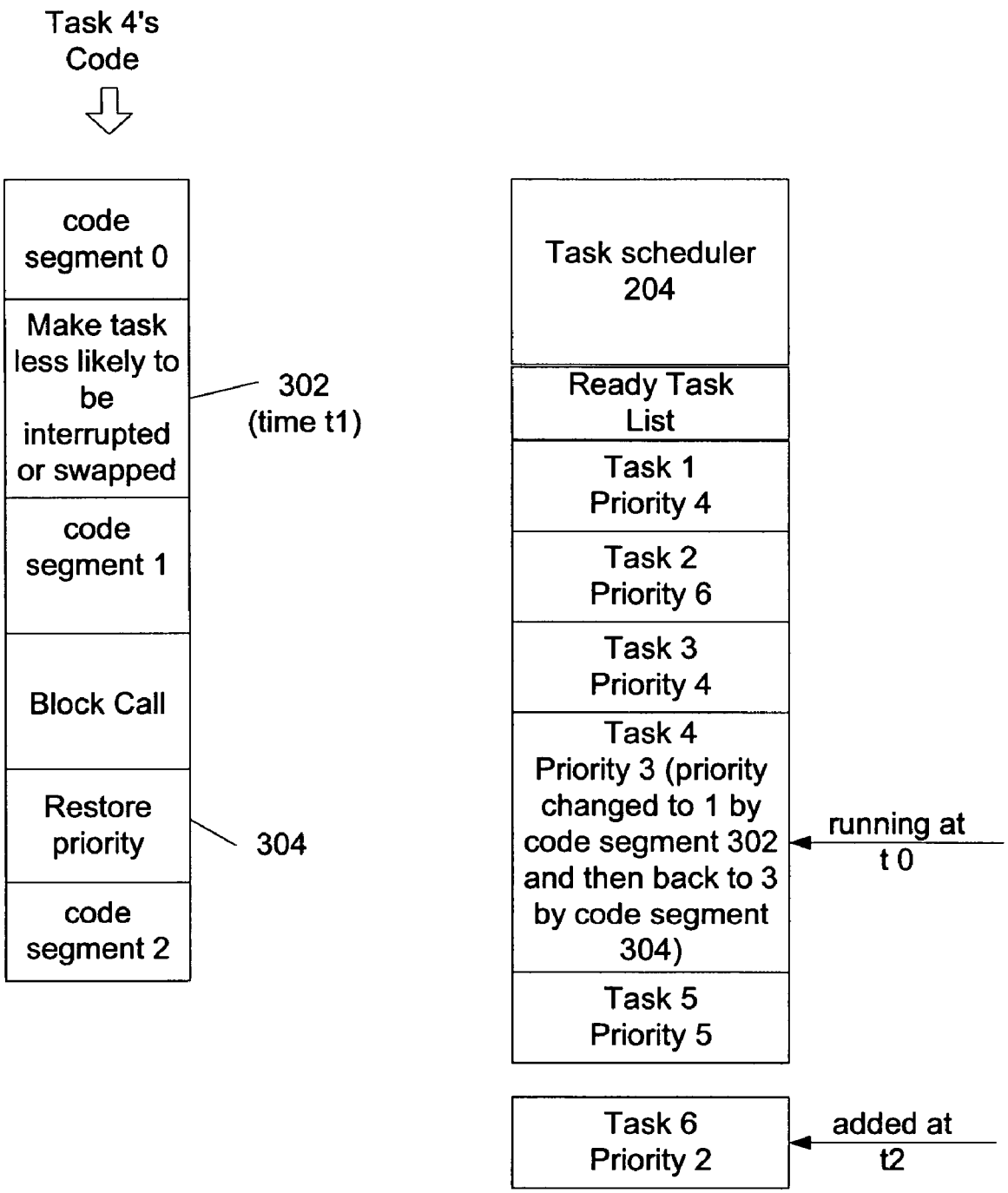
FIGS. 3 and 4 depict examples of task prioritizations in accordance with embodiments of the present invention.
Figure 4:
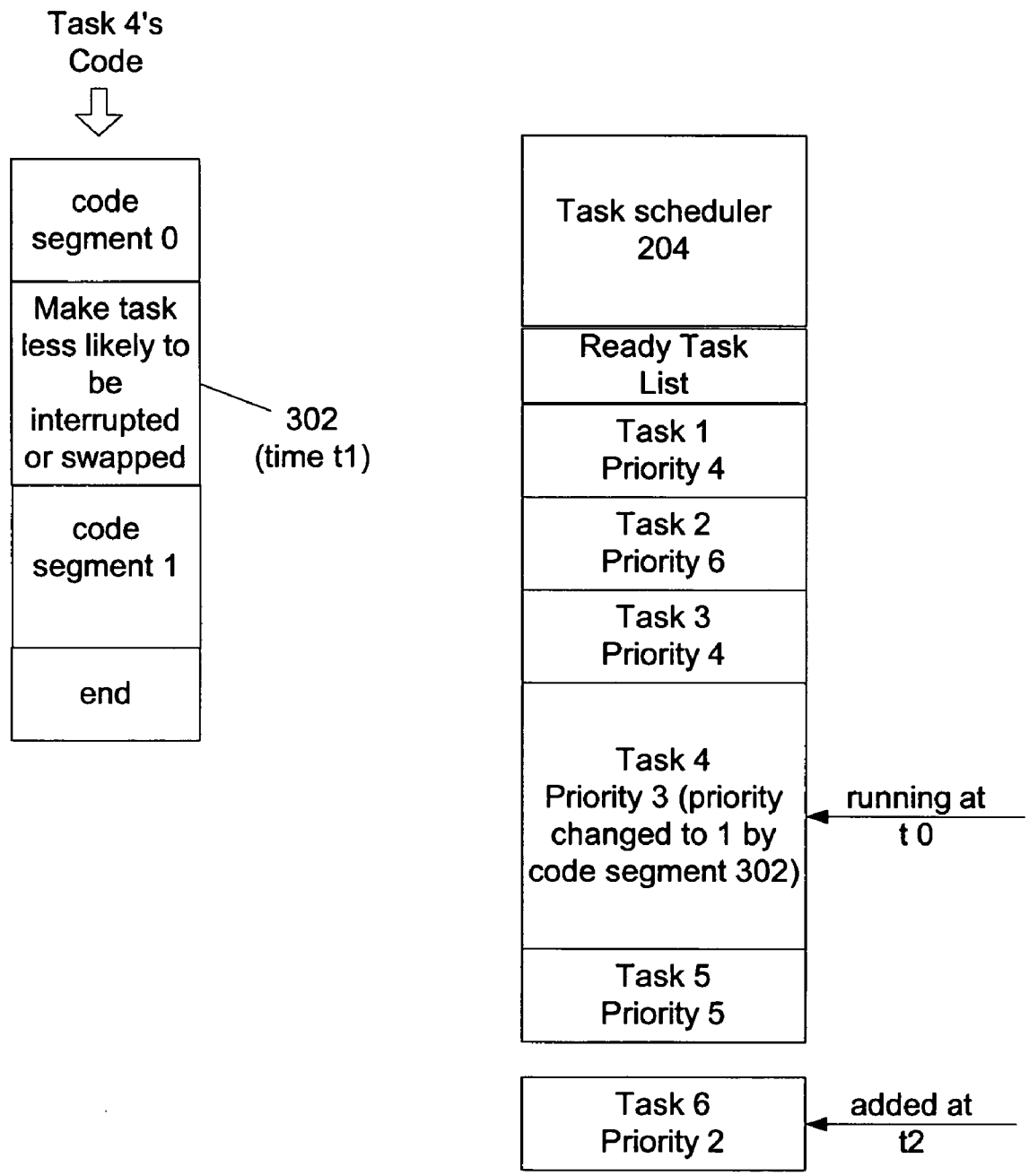

FIGS. 3 and 4 depict examples of task prioritizations in accordance with embodiments of the present invention. Referring to the example of FIG. 3, task scheduler 204 utilizes a ready task list to store a list of tasks that are available to execute. In this example, at time t0, there are tasks 1 to 5, each with its own assigned priority number. At time t2, task 6 is added to the ready task list. In this example, task scheduler 204 schedules the task with the highest priority (e.g., the task with the lowest associated priority number) to execute.

In this example, at time t0, task 4 executes based in part on having a lowest associated priority number. Example contents of the task 4 code are depicted. In this example, prior to a block call portion of the task 4 code, at code segment 302, the priority of task 4 changes so that task 4 is less likely to be interrupted or swapped-out. A block call portion may be a region where task 4 allows another task to execute (e.g., task 4 waits for a semaphore or other resource to execute). In this example, code segment 302 (which occurs at time t1) lowers the priority number of task 4 from priority 3 to a priority level 1, thereby increasing the priority of task 4. In another example (not depicted), code segment 302 lowers the priority number of task 4 from priority 3 to a priority 2. In yet another example (not depicted), code segment 302 sets the priority number of task 4 to be such that task 4 is uninterruptible and unswappable.

At time t2, task 6 is added to the ready task list. Task 6 has a priority that is higher than that of task 4 prior to the priority number adjustment in code segment 302. However, task scheduler 204 does not interrupt or swap-out task 4 with task 6 because the priority number of task 4 after adjustment by code segment 302 gives task 4 priority over task 6. In this example, after completion of the blocking call, code segment 304 restores the priority number of the task 4 to the level prior to adjustment by code segment 302 (e.g., priority 3). After code segment 304, task scheduler 204 may interrupt or swap-out task 4 with task 6.

Code segment 302, which adjusts the priority number of task 4 so that task 4 is less likely to be interrupted or swapped-out, may be added prior to any portion of the task that can be readily interrupted or swapped-out (e.g., a blocking call). The location of code segment 302 within task 4 may be based on when it would be inefficient to interrupt task 4 given the proximity to a region that is likely interruptable or swappable (e.g., block call). For example, code segment 302 may be placed after code segment 1 or may be placed prior to code segment 0.

FIG. 4 depicts an example that is similar to that of FIG. 3 except that task 4 ends instead of providing a block call and restoring the priority number of task 4 (which occurs in action 304 of FIG. 3).

Figure 5:
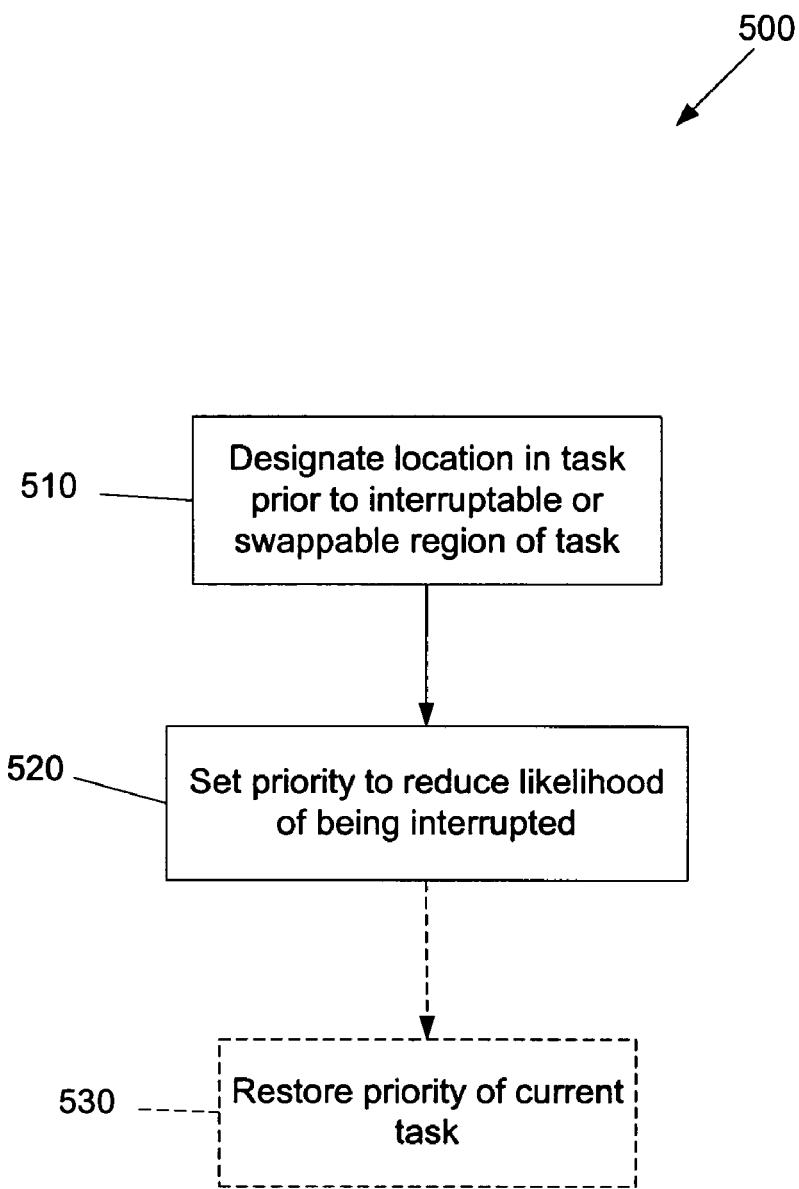
FIG. 5 depicts an example flow diagram of a manner by which to produce a code segment that reduces task switching overhead, in accordance with an embodiment of the present invention.

FIG. 5 depicts an example flow diagram of a manner by which to produce a code segment that reduces task switching overhead in accordance with an embodiment of the present invention. In action 510, a location in a task prior to a region of the task that can be likely interrupted or swapped-out (e.g., blocking region or end of task) is identified. This location may be based on when it would be inefficient to interrupt the task given the proximity to a region that is likely interruptable or swappable, such as a block call or an end of task.

In action 520, a code segment is added to the task at the location identified in action 510 to set the priority number of the task so that the likelihood of the task being interrupted or swapped-out is reduced.

In action 530, a code segment is added to the task to restore the priority number of the task to the level prior to that set in action 520. For example, action 530 may be added after the region that is likely interruptable or swappable, such as a block call or an end of task. Action 530 may not be used in all circumstances. For example, if the task ends, action 530 may not be used.

The drawings and the forgoing description gave examples of the present invention. While a demarcation between operations of elements in examples herein is provided, operations of one element may be performed by one or more other elements. The scope of the present invention, however, is by no means limited by these specific examples. Numerous variations, whether explicitly given in the specification or not, such as differences in structure, dimension, and use of material, are possible. For example, any computer system may utilize embodiments of the present invention described herein. The scope of the invention is at least as broad as given by the following claims.

What is claimed is:

1. A method comprising:
   executing a first code segment of a first task;
   executing a second code segment of the first task to adjust a priority of the first task from a first level to a second level to reduce a likelihood of the first task being replaced with another task; and
   executing a third code segment of the first task, wherein the third code segment follows the second code segment; and
   identifying a location in a task prior to a region of the task that is likely interrupted or swapped-out and using the location as a base on when it would be inefficient to interrupt the task given the proximity to the region that is likely interrupted or swapped-out.

2. The method of claim 1, further comprising restoring priority of the first task to the first level after completion of the third code segment.

3. The method of claim 1, wherein the third code segment comprises ending the first task.

4. The method of claim 1, wherein the third code segment includes a blocking call.

5. The method of claim 1, further comprising selecting each task to execute based on a preemptive multitasking strategy with time slicing.

6. The method of claim 1, further comprising selecting each task to execute based on a preemptive multitasking strategy.

7. A method comprising:
adding a first task to a ready task list;
scheduling the first task to perform based in part on an associated priority, wherein the first task includes a first code region to adjust priority associated with the first task from a first level to a second level prior to entering a second code region that is more likely than the first code region to allow a change to a task different from the first task;
adding a second task to a ready task list, wherein the second task has an associated priority;
scheduling the second task to perform based in part on an associated priority, wherein the scheduling the second task is less likely to replace the first task with the second task based in part on the first code region adjusting priority to the second level; and
identifying a location in a task prior to a region of the task that is likely interrupted or swapped-out and using the location as a base on when it would be inefficient to interrupt the task given the proximity to the region that is likely interrupted or swapped-out.

8. The method of claim 7, wherein the second code region comprises a blocking call region.

9. The method of claim 7, wherein the second code region comprises an end of task.

10. The method of claim 8, wherein the first task further comprises a third code region to restore priority of the first task to the first level after completing execution of the second code region.

11. The method of claim 7, further comprising executing each task based on a preemptive multitasking strategy with time slicing.

12. The method of claim 7, further comprising executing each task based on a preemptive multitasking strategy.

13. An apparatus comprising:
a processor;
a memory device, wherein the memory device includes code segments that instruct the processor to:
execute a first code segment of a first task,
execute a second code segment of the first task to adjust a priority of the first task from a first level to a second level to reduce a likelihood of the first task being replaced with another task,
execute a third code segment of the first task, wherein the third code segment follows the second code segment; and
identifying a location in a task prior to a region of the task that is likely interrupted or swapped-out and using the location as a base on when it would be inefficient to interrupt the task given the proximity to the region that is likely interrupted or swapped-out.

14. The apparatus of claim 13, further comprising code segments to restore priority of the first task to the first level after completion of the third code segment.

15. The apparatus of claim 13, wherein the third code segment comprises ending the first task.

16. The apparatus of claim 13, wherein the third code segment includes a blocking call.

17. An apparatus comprising:
a processor;
a memory device, wherein the memory device includes code segments that instruct the processor to:
add a first task to a ready task list,
schedule the first task to perform based in part on an associated priority, wherein the first task includes a first code region to adjust priority associated with the first task from a first level to a second level prior to entering a second code region that is more likely than the first code region to allow a change to a task different from the first task,
add a second task to a ready task list, wherein the second task has an associated priority,
schedule the second task to perform based in part on an associated priority, wherein the scheduling the second task is less likely to replace the first task with the second task based in part on the first code region adjusting priority to the second level; and
identifying a location in a task prior to a region of the task that is likely interrupted or swapped-out and using the location as a base on when it would be inefficient to interrupt the task given the proximity to the region that is likely interrupted or swapped-out.

18. The apparatus of claim 17, wherein the second code region comprises a blocking call region.

19. The apparatus of claim 17, wherein the second code region comprises an end of task.

20. The apparatus of claim 18, wherein the first task further comprises a third code region to restore priority of the first task to the first level after completing execution of the second code region.

21. An article comprising a storage medium, the storage medium comprising machine readable instructions stored thereon to:
execute a first code segment of a first task;
execute a second code segment of the first task to adjust a priority of the first task from a first level to a second level to reduce a likelihood of the first task being replaced with another task; and
execute a third code segment of the first task, wherein the third code segment follows the second code segment.

22. The article of claim 21, further comprising instructions to restore priority of the first task to the first level after completion of the third code segment.

23. The article of claim 21, wherein the third code segment comprises ending the first task.

24. The article of claim 21, wherein the third code segment includes a blocking call.

25. An article comprising a storage medium, the storage medium comprising machine readable instructions stored thereon to:
add a first task to a ready task list;
schedule the first task to perform based in part on an associated priority, wherein the first task includes a first code region to adjust priority associated with the first task from a first level to a second level prior to entering a second code region that is more likely than the first code region to allow a change to a task different from the first task;
add a second task to a ready task list, wherein the second task has an associated priority;
schedule the second task to perform based in part on an associated priority, wherein the scheduling the second task is less likely to replace the first task with the second task based in part on the first code region adjusting priority to the second level; and
identifying a location in a task prior to a region of the task that is likely interrupted or swapped-out and using the location as a base on when it would be inefficient to interrupt the task given the proximity to the region that is likely interrupted or swapped-out.

26. The article of claim 25, wherein the second code region comprises a blocking call region.

27. The article of claim 25, wherein the second code region comprises an end of task.

28. The article of claim 26, wherein the first task further comprises a third code region to restore priority of the first task to the first level after completing execution of the second code region.

29. A system comprising:
a first storage subsystem and a second storage subsystem;
a first circuit card including first circuitry capable of being coupled to the first storage subsystem, wherein the first circuitry further includes an I/O controller device, the I/O controller device comprising:
a processor;
a memory device, wherein the memory device includes code segments that instruct the processor to:
execute a first code segment of a first task,
execute a second code segment of the first task to adjust a priority of the first task from a first level to a second level to reduce a likelihood of the first task being replaced with another task, and
execute a third code segment of the first task, wherein the third code segment follows the second code segment;
a second circuit card including second circuitry capable of being coupled to the second storage subsystem; and
identifying a location in a task prior to a region of the task that is likely interrupted or swapped-out and using the location as a base on when it would be inefficient to interrupt the task given the proximity to the region that is likely interrupted or swapped-out.

30. The system of claim 29, wherein the first storage subsystem and the second storage subsystem each comprise one or more respective mass storage devices.

31. The system of claim 29, wherein:
the first storage subsystem comprises a redundant array of inexpensive disks (RAID); and
the second storage subsystem comprises a tape mass storage system.

32. The system of claim 29, wherein the second circuit card includes an I/O controller device.

33. The system of claim 29, further comprising:
a bus; and
a circuit board coupled to the bus, wherein the circuit board comprises a memory and a host processor and wherein the first circuit card and the second circuit card are capable of being coupled to the bus.

34. The system of claim 33, wherein the bus complies with PCI.

35. The system of claim 33, wherein the bus complies with PCI Express.

* * * * *